(12) United States Patent
Keeler

(10) Patent No.: US 8,090,799 B2
(45) Date of Patent: Jan. 3, 2012

(54) SYSTEM AND METHOD FOR PROVIDING PERSISTENT ADVERTISING WITH THIRD PARTY CONTENT IN A DISTRIBUTED INTERNET ACCESS ENVIRONMENT

(75) Inventor: James D. Keeler, Austin, TX (US)

(73) Assignee: Wayport, Inc., Irving, TX (US)

( * ) Notice: Subject to any disclaimer, the term of this patent is extended or adjusted under 35 U.S.C. 154(b) by 746 days.

(21) Appl. No.: 11/671,336

(22) Filed: Feb. 5, 2007

(65) Prior Publication Data

US 2007/0192468 A1 Aug. 16, 2007

Related U.S. Application Data

(60) Provisional application No. 60/765,267, filed on Feb. 4, 2006.

(51) Int. Cl.
*G06F 15/16* (2006.01)
*G06Q 30/00* (2006.01)

(52) U.S. Cl. ........................................ 709/218; 705/14.4

(58) Field of Classification Search .......... 709/217–219, 709/201–203, 227–229; 705/14.4, 14.49, 705/14.51, 14.54, 14.55, 14.69, 14.72, 14.73, 705/14.15; 715/246, 252, 253
See application file for complete search history.

(56) References Cited

U.S. PATENT DOCUMENTS

| | | | |
|---|---|---|---|
| 7,155,451 B1* | 12/2006 | Torres | 707/104.1 |
| 2002/0063727 A1* | 5/2002 | Markel | 345/661 |
| 2002/0082910 A1* | 6/2002 | Kontogouris | 705/14 |
| 2003/0013483 A1* | 1/2003 | Ausems et al. | 455/556 |
| 2005/0027822 A1* | 2/2005 | Plaza | 709/218 |
| 2006/0129688 A1* | 6/2006 | Chatani et al. | 709/229 |
| 2007/0038931 A1* | 2/2007 | Allaire et al. | 715/526 |
| 2007/0050251 A1* | 3/2007 | Jain et al. | 705/14 |
| 2007/0079327 A1* | 4/2007 | Khoo et al. | 725/35 |
| 2007/0101289 A1* | 5/2007 | Awada et al. | 715/784 |
| 2007/0226621 A1* | 9/2007 | Dayan et al. | 715/706 |
| 2007/0239528 A1* | 10/2007 | Xie et al. | 705/14 |
| 2007/0288863 A1* | 12/2007 | Ording et al. | 715/788 |
| 2007/0294096 A1* | 12/2007 | Randall et al. | 705/1 |
| 2009/0012868 A1* | 1/2009 | DeAngelis | 705/14 |
| 2009/0265214 A1* | 10/2009 | Jobs et al. | 705/10 |

* cited by examiner

*Primary Examiner* — Ajay Bhatia
(74) *Attorney, Agent, or Firm* — Yudell Isidore Ng Russell PLLC

(57) ABSTRACT

A method, system, and computer program product that enables persistent display of advertising and other service provider content during access via a gateway access system to third party content on a separate network. A connection is enabled between a personal computing device (PCD) and the gateway access system. The gateway access system facilitates retrieval of a first content from the network to be displayed within a first window on the PCD. The gateway access system provides program code to the PCD that when executed enables persistent display of a second window on the PCD that does not overlap with the first window. A second content is transmitted for display within the second window on the PCD, where the second content is displayed within the persistent window on the PCD along with the display of the first content.

31 Claims, 9 Drawing Sheets

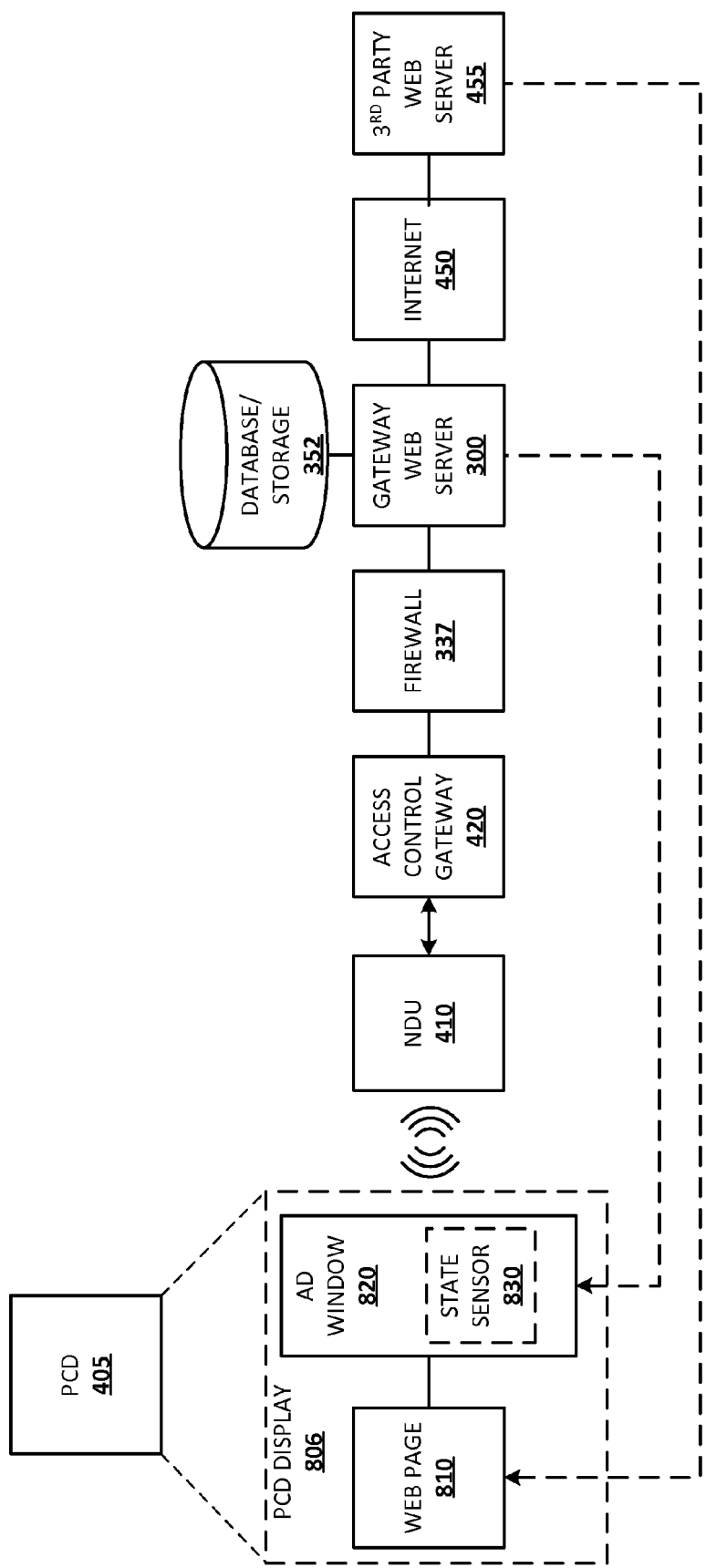

SYSTEM AND METHOD FOR PROVIDING PERSISTENT ADVERTISING WITH THIRD PARTY CONTENT IN A DISTRIBUTED INTERNET ACCESS ENVIRONMENT

PRIORITY CLAIM

Benefit of priority under 35 U.S.C. §119(e) is claimed based on U.S. Provisional Application No. 60/765,267, entitled, "System and Method for Providing Advertising and Content in a Distributed Internet Access Environment," filed on Feb. 4, 2006, which disclosure is incorporated herein by reference.

CROSS-REFERENCE TO RELATED APPLICATIONS

The present application is related to the following co-pending U.S. patent applications filed on even date herewith incorporated herein by reference in their entirety: Ser. No. 11/671,333, entitled "SYSTEM AND METHOD FOR PROVIDING ADVERTISING AND CONTENT IN A DISTRIBUTED INTERNET ACCESS ENVIRONMENT"

BACKGROUND

1. Technical Field

The present invention generally relates to the field of network access providers and in particular to the field of providing distributed network access via gateways. Still more specifically, the present invention relates to the field of providing content during network access via gateway(s) of an network access provider.

2. Description of the Related Art

Several Internet service providers (ISPs) provide services at public venues such as hotels, airports, and restaurants. Where the ISP is accessible via wireless access, the area at which the access signal is detectable is called a "hot-spot". ISPs may also provide distributed access in metropolitan area networks (MANs) or other venues. Enabling access at these venues/locations is typically implemented using an access system that includes a wired or wireless access point and a gateway.

FIG. 1 illustrates an example configuration of a gateway access system utilized to provide a personal computing device (PCD) 105 of a user with access to a background network, such as the Internet 150, via an access point in a public venue/location. As shown, the gateway access system 100 comprises network distribution unit (NDU) 110, which represents the wired or wireless access point of the ISP at the location. PCD 105 is shown in wireless connection with NDU 110 in FIG. 1, but can be coupled through a wired connection in alternative embodiments. Gateway access system 100 of the ISP also comprises access control gateway 120, which controls whether a user is allowed to connect to the Internet 150. Access control gateway 120 controls the connection to the Internet 150 through a firewall 130, which blocks internet access until certain conditions are met. For example, internet access may be blocked until: (a) the user provides appropriate authorization parameters (login ID, password, and/or other login credentials); and/or (b) the user pays for the access (assuming the access is not free); and/or (c) the user otherwise agrees to terms of use. Firewall 130 executes on gateway web server 140, and provides the mechanism that completes the conditional blocking/unblocking of access to the Internet 150. The gateway 120, gateway web server 140 and firewall 130 may be proximal to the venue/location of the NDU 110 and/or PCD 105, or remotely located.

Personal computing device (PCD) 105 is a user device, utilized to access the access point (NDU 110) and ultimately the Internet 150. PCD 105 may be a laptop or other internet-ready device, such as a handheld computer, or "Wi-Fi" (Wireless Fidelity) phone, a Wi-Fi enabled game device, or other similar system. PCD 105 is configured with a wired or wireless network interface card and a web browser that displays web pages via standard hypertext transfer protocol (http) and/or secure http (https), for example. PCD 105 thus connects to NDU 110 via wired or wireless connection.

After establishing the communication with the PCD 105 (via NDU 110 and access control gateway 120), the gateway web server 140 directs the PCD 105 to a "connection" page hosted on the gateway web server 140 to complete an initial connection process. This process typically occurs when a web browser is opened on the PCD 105 and before the PCD 105 is allowed to browse third party web pages on the Internet. The connection page presents user connection options, prompts for payment, terms of use, and other features, which are displayed within the web browser of the PCD 105. As shown in FIG. 2, there may be several gateway pages 215 (numbered "pages 1-L") that are displayed to the user on the ISP's web server 140 during the initial connection process. With these pages 215, the user of PCD 105 is able to accepting the terms and/or input payment information (e.g. credit card number), user information and/or other requested information. After the user completes interacting with the gateway pages 215 (and enters the requested information), the firewall blocking the access to the Internet 150 is removed, and the user may then utilize PCD 105 to browse third party web pages 225 via the Internet 150.

In conventional implementations of these gateway access systems, several network service providers (or gateway providers) provide some form of advertising content to the user during the credential/login process. The advertising may be provided within the connection page(s), on one or more of the gateway pages 215, or during the period after completing the initial connection process but prior to displaying the content of the first third-party web page 225 requested by the user.

The current state of the art in providing advertising by the service provider (SP) is to gather information on the customer during the initial connection process and to optionally provide advertising, specialized content, or other items of interest to the customer via the gateway pages 1-L (215), which are displayed during the initial connection process. With these conventional gateway access systems, however, after the initial connection process, the ISP "relinquishes control" of the PCD 105 and the SP has no further way of presenting advertising or other content to the user without interrupting a session with a message window placed on top of screen currently displayed on the PCD 105 (e.g. a time expired warning message).

One method has been proposed to enable delivery of further "advertising" content to the user following the initial connection process. In this method, the SP relays information about the user or the PCD (e.g., location) to other partners that provide web services on the Internet. Then, if the user happens to visit the website(s) of one of the partners, the partner's web site(s) is able to recognize the user of some characteristic of the user or PCD and display specific, targeted information to the user while the user is browsing the partner's site. This targeted advertising is based solely on known information about that user or user's PCD, which are collected during the connection process, and requires the user browse to the partner's web site.

An obvious limitation of this method is that information (e.g., advertising content) can only be displayed to the user if the user happens to browse to that particular partner's website(s). Given the millions of websites that are on the Internet, the likelihood of any user of the gateway access system actually visiting even one of the partner's web site(s) is relatively small. Thus, as is made clear by the above descriptions, the state of the art in providing SP-directed/influenced content to users who utilize the existing gateway access systems is severely limited. The existing gateway systems have no practical way of offering advertising while the user is browsing the Internet following the initial connection process.

OVERVIEW OF EMBODIMENTS

Disclosed are a method, system, and computer program product that enable persistent display of advertising and other service provider content during access via a gateway access system to third party content on a separate network. A connection is enabled between a personal computing device (PCD) and the gateway access system. The gateway access system facilitates retrieval of a first content from the network to be displayed within a first window on the PCD. The gateway access system provides program code to the PCD that when executed activates display of a second persistent window on the PCD that does not overlap with the first window. A gateway access system transmits a second content for output within the second window on the PCD, where the second content is displayed as a persistent, concurrent output on the PCD along with the display of the first content.

In one embodiment, the program that enables persistent display of the second window is provided via a download to the PCD during an initial connection process. The gateway access system also provides a program or subroutine that, when executed, links a state sensor with the second window. The state sensor detects pre-defined operations including an attempt to close, hide, or minimize the second window at the PCD. The state sensor responds to a detection of one of these pre-defined operations by alerting the gateway access system, while preventing the operation from completing.

In one embodiment, the network includes the Internet connected to the gateway server, and the first content is a web page provided by a third party web site accessible via the Internet. Also, in one embodiment, the second content is an advertisement provided by the service provider or a business partner of the service provider.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 8 is a block diagram showing the gateway access system configured to enable addition of advertising and other secondary content to the display of a third party web page retrieved directly from the third party web server (or web site), according to one embodiment of the invention;

DETAILED DESCRIPTION OF AN ILLUSTRATIVE EMBODIMENT

Figure 1:
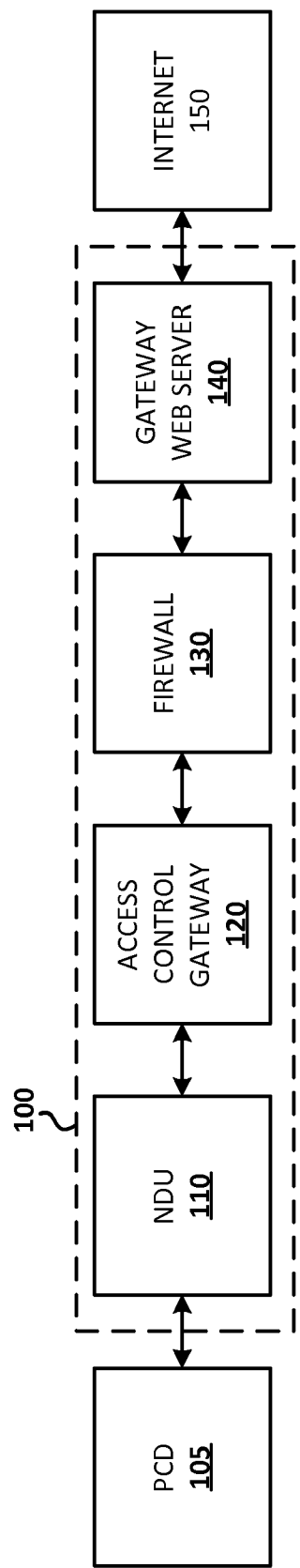
FIG. 1 is a block diagram illustrating the configuration of an access system that enables public access to the Internet (or background network) via a Service Provider (SP) gateway, according to the prior art.
Figure 2:
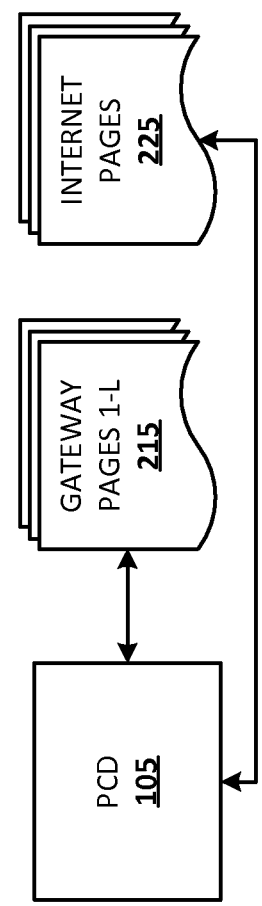
FIG. 2 illustrates independent access of a personal computing device (PCD) to gateway pages and Internet pages, respectively, using the access system of FIG. 1, according to the prior art.

The described embodiments of the present invention provide a method, system, and computer program product for providing advertising and/or other content in a distributed internet access environment. The advertising and/or other content is provided during access to a third party web site via a gateway Service Provider (SP) portal. The SP configures the gateway web server to act as a web proxy server, which proxies the third party web pages that are requested on a user's personal computing device (PCD), which is connected to the Internet via the gateway access system. The gateway web server adds advertising or other content/items of interest to these web pages (SP content), and the web pages are then presented on the PCD's display with the added content displayed in a persistent manner. The embodiments provide a novel method of offering these advertising and other services in a persistent fashion after the customer's initial connection experience.

In the following detailed description of exemplary embodiments, specific exemplary embodiments are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral, representative of the figure number (e.g., 4xx for FIGS. 4 and 5xx for FIG. 5). The specific numerals assigned to the elements are provided solely to aid in the description and not meant to imply any limitations (structural or functional) on the invention.

It is further understood that the use of specific parameter names are for example only and not meant to imply any limitations on the embodiments. The embodiments may thus be implemented with different nomenclature/terminology utilized to describe the above parameters, without limitation. Within the description, Service Provider (SP) content refers to any type of content, whether advertisements, links to advertisements, links to other web pages, general information, data, and the like that is provided within the SP frame and displayed in a persistent fashion on the PCD's web browser along with the third party web page. In one embodiment, the SP content is described as being stored in a database associated with the gateway web server. Also, as utilized herein, the term "frame" (e.g., SP content frame) may refer, in various embodiments, to a structure within which visible content (e.g., text, graphic, multimedia) may be displayed within a web browser window and/or on a display screen of a computing device. The term "frame" may include a standard web frame, an inline frame (iframe), a window, or similar component, and may be generated by a process such as an application or an operating system within a data processing system.

Figure 3:
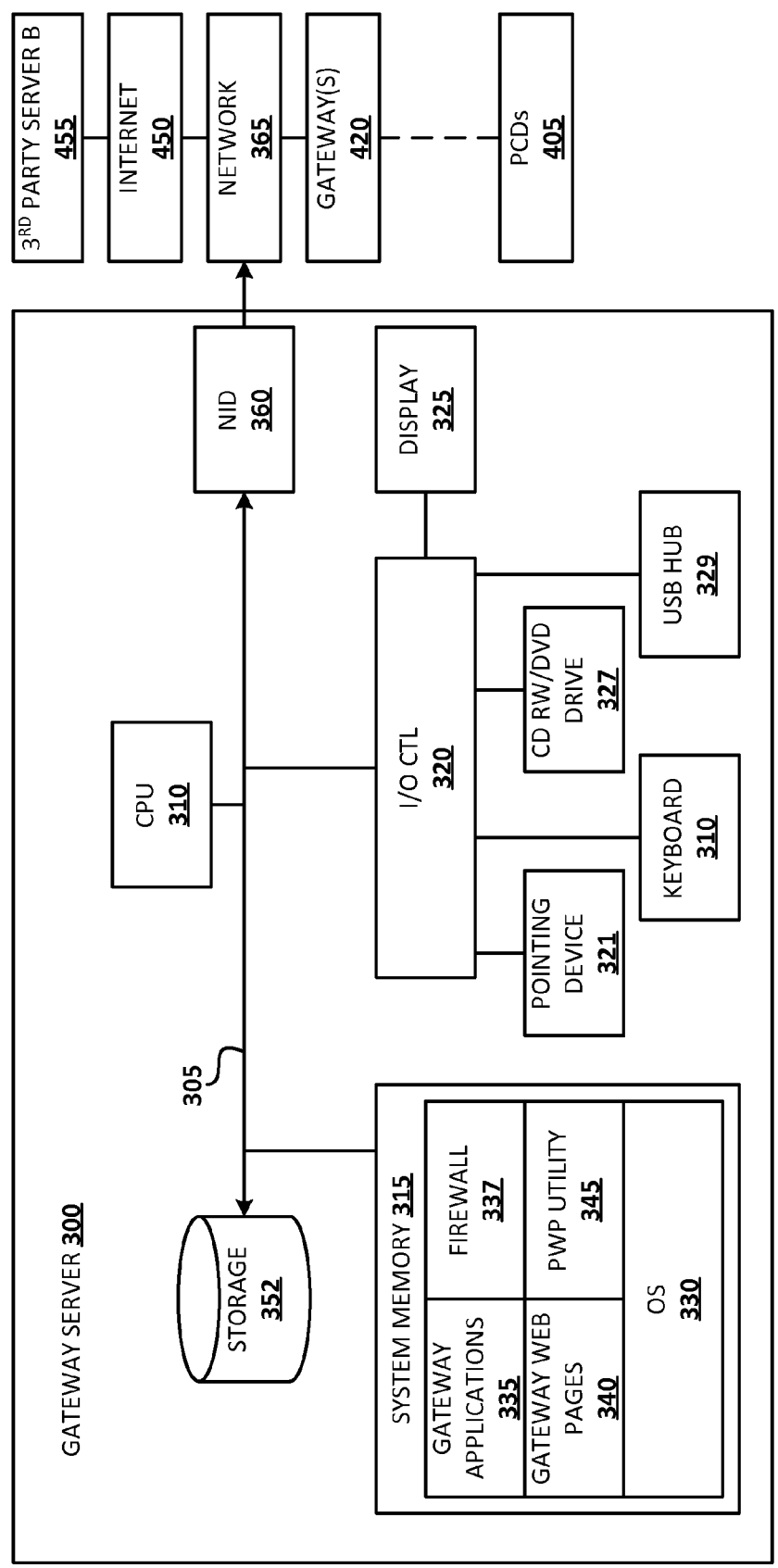
FIG. 3 is a block diagram representation of an ISP server within which various features of the present invention may advantageously be implemented, according to one embodiment.

Referring now to FIG. 3, there is depicted a block diagram representation of a data processing system (and connected network) that may be utilized as the gateway web server (or gateway server, for short), in accordance with an illustrative embodiment. As described in greater detail below, gateway server 300 controls the gateways 420 and provides and/or controls the content that may be displayed on and/or access by the PCDs 405 connected to the gateways 420. Gateway server 300 may also be referred to SP server, as the gateway server is assumed to be owned or controlled by the service provider, in one embodiment.

As shown, gateway server 300 comprises at least one processor or central processing unit (CPU) 310 connected to system memory 315 via system interconnect/bus 305. Also connected to system bus 305 is I/O controller 320, which provides connectivity and control for input devices, of which pointing device (or mouse) 321 and keyboard 323 are illustrated, and output devices, of which display 325 is illustrated. Additionally, a multimedia drive 327 (e.g., CDRW or DVD drive) and USB (universal serial bus) hub 329 are illustrated, coupled to I/O controller. Multimedia drive 327 and USB hub 327 may operate as both input and output (storage) mechanisms. Gateway server 300 also comprises storage 352, within which data/instructions/code utilized to provide the gateway web pages and/or advertising or other SP content (as described below) may be stored.

Gateway server 300 is also illustrated with a network interface device (NID) 360, with which gateway server 300 connects to an access network (365) of gateways 420 and to the Internet 450. Gateways 420 provide physical access points for connection (wired or wireless) to PCDs 405. Gateway server 300 connects with other third party servers 455 over the Internet 450, and the Internet 450 is also made accessible to the PCDs 405 via the ISP gateways 420.

In the described embodiments, Internet 450 is a worldwide collection of networks and gateways that utilize the Transmission Control Protocol/Internet Protocol (TCP/IP) suite of protocols to communicate with one another. Those of ordinary skill in the art will appreciate that the hardware depicted in FIG. 3 is a basic illustration of an ISP server, and thus the hardware utilized in actual implementation may vary. Thus, the depicted example is not meant to imply architectural limitations with respect to the present invention.

Notably, in addition to the above described hardware components of gateway server 300, various features of the invention are completed via software code stored within memory 315 or other storage (e.g., storage 352) and executed by CPU 310. Thus, illustrated within memory 315 are a number of software components, including operating system (OS) 330 (e.g., Microsoft Windows®, a trademark of Microsoft Corp, or GNU®/Linux®, registered trademarks of the Free Software Foundation and The Linux Mark Institute), gateway applications 335, firewall 337, gateway web pages 340, and Proxied WebPage Presentation (PWP) utility 345. In actual implementation, PWP utility 345, server controlled gateway applications 335 and ISP web pages 340 may be combined as a single application collectively providing the various functions of each individual software component when the corresponding code is executed by the CPU 310. For simplicity, PWP utility 345 is illustrated and described as a stand alone or separate software component, which provides specific functions, as described below.

CPU 310 executes PWP utility 345 as well as OS 330, which supports the user interface features of PWP utility 345. In the illustrative embodiment, PWP utility 345 generates/provides several graphical user interfaces (GUI) to enable user interaction with, or manipulation of, advertising or other SP-supplied content provided to a PCD 405 via the gateway(s) 420. Among the software code/instructions provided by PWP utility 345, and which are specific to the invention, are: (a) code for prompting for and enabling user selection of whether to display advertising and other SP content along with third party web pages; (b) code for generating and displaying a proxy (re-creation) of a third party web page that is re-oriented within the PCD's browser; and (c) code for enabling the concurrent, (and non-overlapping) persistent display of advertising or other SP-supplied content along with the third party web page on the PCD's browser. For simplicity of the description, the collective body of code that enables these various features is referred to herein as PWP utility 345. According to the illustrative embodiment, when CPU 310 executes PWP utility 345, ISP server 300 initiates a series of functional processes that enable the above functional features as well as additional PAC features/functionality, which are described below within the description of FIGS. 4-11.

Figure 4:
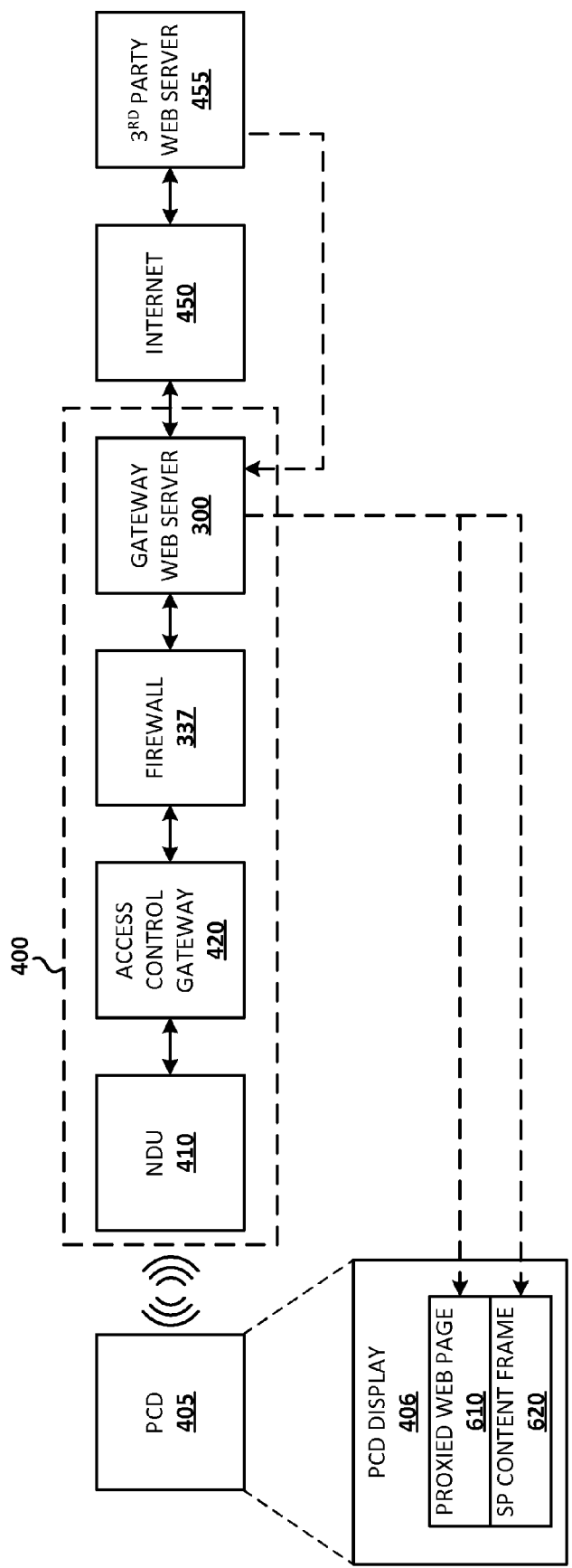
FIG. 4 is a block diagram illustrating the configuration of a gateway access system that controls public access to an Internet-connected third party web server via a Service Provider (SP) gateway, according to one embodiment of the invention.

With reference now to FIG. 4, which illustrates an example network (or gateway) access system utilized to provide a user's PCD (405) with access (wireless or wired), via a gateway access point, to web pages of a third party web server 455 connected to the Internet 450. As shown, the network access system 400 comprises network distribution unit (NDU) 410, which represents the wired or wireless access point of the ISP at the specific location. Network access system 400 of the service provider also comprises access control gateway 420, which controls whether a user is allowed to connect to the gateway web server 300 and ultimately the Internet 450. The access control gateway 420 controls the connection through firewall 430, which blocks internet access until certain conditions are met. For example, internet access may be blocked until: (a) the user provides appropriate authorization parameters (login ID, password, and/or other login credentials); and/or (b) the customer pays for the access; and/or (c) the user otherwise agrees to terms of use for the access. Firewall 337 executes on gateway web server 300 and provides the mechanism that completes the conditional blocking/unblocking of access to the Internet 150. The gateway 420, gateway web server 300 and firewall 337 may be proximal to the venue/location of the NDU 410 and/or PCD 405 or these components/devices may be located remotely from the NDU 410.

Access to the gateway 420 and ultimately the Internet 450 is completed using a customer device, personal computing device (PCD) 405. PCD 405 may be a laptop or other internet-ready device, such as a handheld computer, or "Wi-Fi" (Wireless Fidelity) phone, a Wi-Fi enabled game device, or other similar system. PCD 405 is configured with a wired or wireless network interface card and a web browser that displays web pages via standard hypertext transfer protocol (http) and/or secure http (https), for example. PCD 405 thus connects to NDU 410 via wired or wireless connection.

After establishing the communication with the PCD 405 (via NDU 410 and access control gateway 420), the gateway web server 300 directs the PCD 405 to a "connection" page hosted on the gateway web server 300 to complete an initial connection process. This process occurs when a web browser is first opened on the PCD 405 and before the PCD 405 is allowed to browse third party web pages on the Internet 450. The connection pages present user connection options, prompts for payment, terms of use, and other features, which are displayed within the web browser of the PCD 405.

During the initial connection process, the various connection pages are displayed to the user on the PCD's display. The user of PCD 405 interacts with these pages and is able to accepting the terms and/or input payment information (e.g. credit card number), user information and/or other requested information. After the user completes interacting with the connection pages (and enters the requested information), the firewall 337 blocking the access to the Internet 450 is removed, and the PCD 405 may then be utilized to browse third party web pages via the Internet 150. According to the embodiments of the invention, the content of the third party web pages are displayed along with SP-supplied content (SP content), such as advertisements, which are displayed in a persistent manner on the PCD's display. FIG. 4 shows a path through gateway web server 300 by which a requested web page is retrieved from a third party web server and proxied at the gateway web server 300. Also illustrated is an example transmission path for both the proxied content and SP content from gateway web server 300 to the PCD 405. Both the proxied content and the SP content are then concurrently outputted/displayed within the PCD display 406.

Figure 5:
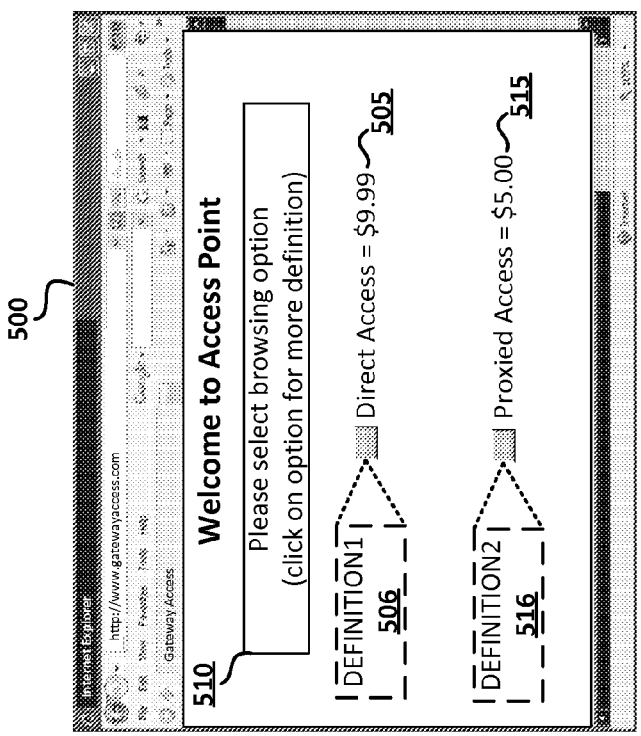
FIG. 5 illustrates an example initial connection page of a gateway access system with selectable options for enabling proxying of requested web page and addition/removal of SP content, according to one embodiment of the invention.

In one embodiment, in addition to providing connection pages for the user to complete entry of payment and other connection information during the initial connection process, the user is also provided a notification of the addition of the persistent SP content within the standard (proxied access) connection experience. That is, during the connection process, PWP utility 345 provides a notification of this feature, and PWP utility may also provide the user with the option of electing to not have the SP content added to the user's connection experience. FIG. 5 illustrates an example "Welcome and Selections" page 500 with a corresponding welcome and selection message 510. Welcome and Selections page 500 also includes a prompt of two selectable options, namely "Direct access" option 505 and "Proxied access" option 515. As provided, each option has an associated fee, with Direct access option 505 having a higher fee ($9.99) than the fee ($5.00) for Proxied access option 515. In the illustrative embodiment, each option (505 and 515) has an associated definition box (506 and 516), which explains what the particular option means. The definition boxes (506, 516) are hidden until the user places a pointer over (or otherwise selects) the particular option. Thus, when the user places the pointer (or "left clicks" on) "Direct access" option 505, the corresponding Direct access definition1 box 506 opens on the display screen 500. Likewise, when the user places the pointer (or right clicks on) "Proxied access" option 515, the corresponding "Proxied access" definition2 box 806 opens on the display screen 500.

In one embodiment, the user may be given the option to pay an intermediate or reduced amount for limited advertisements. As shown, access via the proxied access option may be provided for a reduced/lower fee. However, in one embodiment, the lost revenue from the reduced fee is offset by the cost of the advertising charged to the advertiser. In one embodiment, the advertisers (also referred to as business partners of the SP) are charged a usage fee. With this embodiment, the gateway web server tracks and stores the number of times and/or adds the total length of time the SP content of that business partner is displayed on PCDs connected to the network access system. The SP then charges the business partner based on the usage using a predetermined formula. Most users of PCDs at these public access points are more concerned about reducing the cost of access rather than the inconvenience of having to view a few advertisements while they are browsing the Internet. Thus, the proxied access option is likely to be widely utilized, making the implementation of this persistent SP content feature a good avenue for advertising to large numbers of users.

Alternatively, rather than reduce the standard fee, a higher than normal fee may be charged to users who select the direct access option. Thus, if the customer really does not wish to view advertising or other SP content during the user's access to the background network (Internet 450), the user pays a premium to utilize the service without receiving the SP content. The user thus views the retrieved third party web pages in their normal orientation and size, as provided by the third party web server 455.

Some embodiments of the invention may be implemented without providing the user with an option to not have the SP content displayed. The embodiment presented in FIG. 5 and described herein is thus meant solely for example and not intended to limit the use of alternative embodiments that do not implement this option-selection feature.

Figure 7:
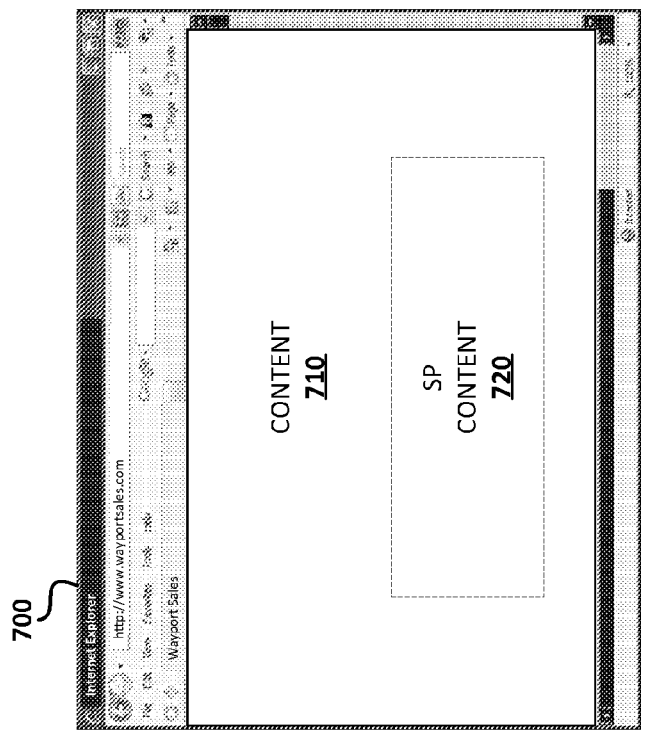
FIG. 7 illustrates an example re-constituted third party web page which includes embedded SP content, according to one embodiment of the invention.

In FIG. 5, when the direct access option 505 is selected, the gateway web server provides the user with direct access to the Internet. The user is then able to view third party web pages without having a persistent SP content frame (described below) displayed on the PCD display and without receiving the web page as a proxy web page that is adjusted in size make room for concurrently displaying the SP content frame. For those users who do not select the direct access option (perhaps because of the cheaper fee for the proxied access option), all subsequent download requests for web pages by that PCD to third party web sites results in the return of a proxied web page from the gateway server 300. The PCD's web browser is modified to include a display of both an SP content frame along with the proxied web page. Examples of this latter implementation are illustrated by FIGS. 7 and 8, which are described below.

Following the initial connection process, gateway web server 300 detects each request from the connected PCD 405 to access/retrieve a third party web page from the third party web server 455. The request may be provided via one of several methods, including, but not limited to: (a) entry of a web address of the third party web page within the web browser of the PCD 405; (b) clicking on a link that opens the third party web page; and (c) selecting an identifier within a favorite's list that links to the third party web page. Once the third party web page is located, PWP utility 345 of gateway web server 300 intervenes in the download of the web page, "intercepts" the download, and proxies the web page on the gateway web server 440. PWP utility 345 configures the proxied web page to fit on a display area that is smaller than the full area of the PCD's display. PWP utility 345 assigns the remaining display area to selected SP content, which is selected from available SP content within the content storage 352 (FIG. 3).

PWP utility 345 of gateway server 300 controls what SP content is provided for display within the SP content frame 620. PWP utility 345 operates to configure the gateway web server 300 as a web proxy server that serves as a proxy for displaying web pages from third party web servers 455. As seen in the various figures, the proxy server (gateway web server 300) is made transparent to the PCD's normal browsing experience; however, an additional SP content frame 620 is added and displayed at predetermined locations (see FIG. 6) on the web browser relative to the requested third party web page, which is proxied and displayed in another window within the web browser.

The SP content selected for posting within SP content frame 620 may be selected based on known information about the user and/or the PCD, such as the known geographic location of the PCD (for example, by determining the location of NDU 410), and/or user demographic information. In one embodiment, PWP utility 345 may also examine the proxied web page 610 and search for key words, which keywords then determine the type of content selected to provide within the SP content frame 620. In yet another embodiment, PWP utility 345 applies other pattern recognition engines, and modifies the content that is displayed in the SP content frame 620 based on that information.

Specific content may be selected without consideration of the PCD's/user's information or the information (keywords) retrieved from the proxied web page. For example, the Service Provider may partner with other content providers to provide links or other advertising content for posting within the SP content frame. By using the gateway web server 300 as a proxy server, the SP is able to retain control over the user's access experience (e.g., what SP content is provided to the user's PCD) after the initial connection process.

This SP content may be "paid for" content, such as advertisements. That is, a third party advertiser (or content provider) may pay the Service Provider to provide/display the content to the user(s) of the Service Provider's gateway access system. The fees charged provide an added revenue stream for the Service Provider and may help subsidize the cost of the user's connection to the gateway access system. Thus, in one embodiment, advertising revenue to the ISP for providing the SP content to the user(s) may be used by the Service Provider to offset the price that the user would otherwise have to pay for using the access point (to access third party web pages and/or the Internet) if such user access was provided without the advertising.

Figure 6:
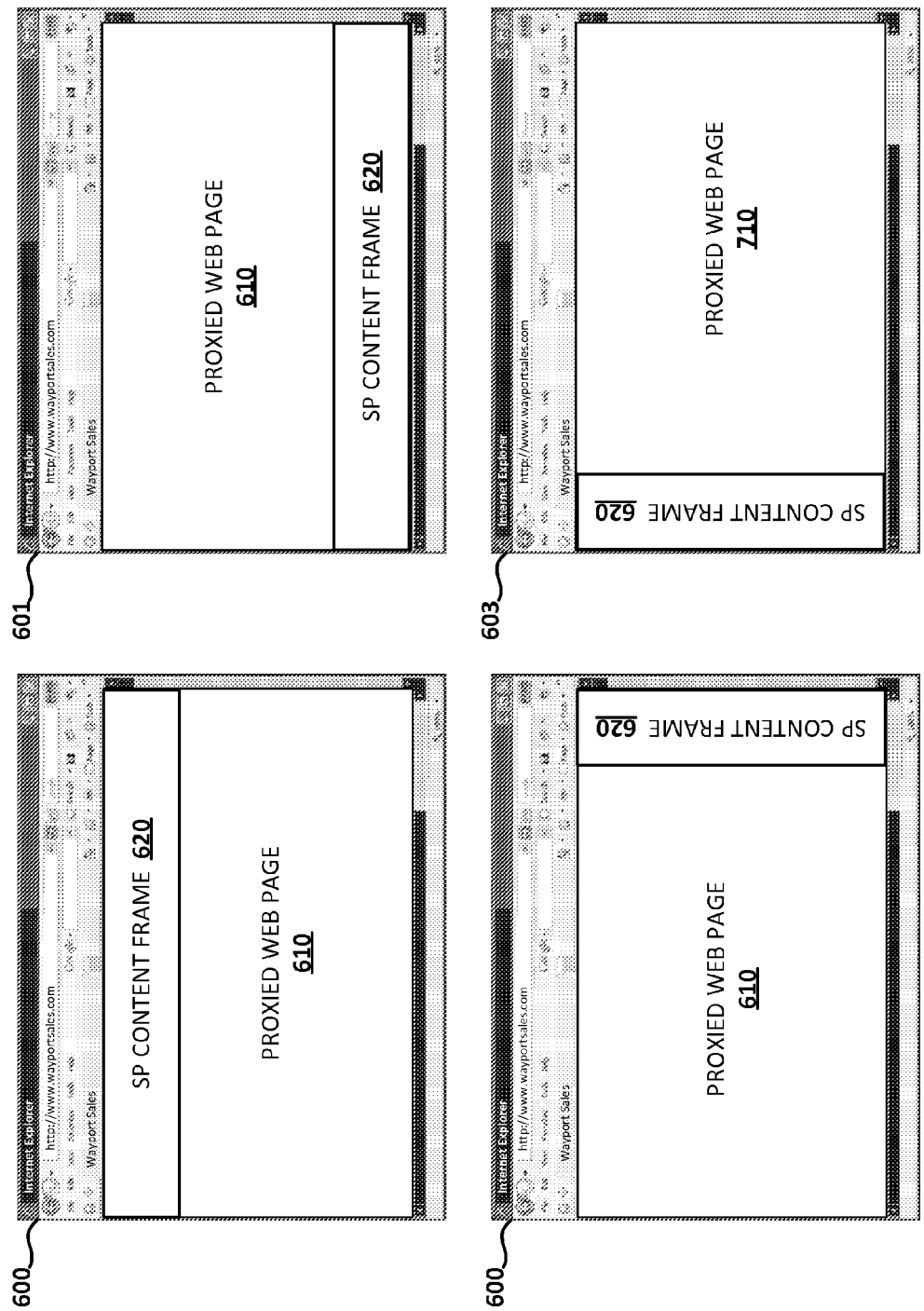
FIG. 6 illustrates example web pages displayed within a PCD's web browser with SP content frame oriented along vertical and horizontal edges of the third party web page, according to embodiments of the invention.

FIG. 6 illustrates four possible configurations of a proxied web page and SP content frame relative to each other within a web browser of PCD 405, in accordance with embodiments of the invention. As shown in each depiction of web browser 500, proxied web page 610 is displayed within a first area of the PCD display screen. Also displayed within a remaining area of web browser 600 on the PCD display screen is SP content frame 620, which provides SP content from gateway web server 440.

Whenever the web browser 600 is open and displays a proxied web page 610 from the gateway web server 300, the proxied web page 610 is displayed along with the SP content (such as an advertisement) within SP content frame 620. The selected SP content is displayed in a pre-set spatial location relative to the web page content (e.g., above, below, or to the right or left of the web page content), based on the location of the SP content frame 620. Thus, the first two web browsers 600 of FIG. 6 illustrate that the SP content frames 620 may be oriented above (620) the proxied web page 610 (or display screen) or below (621) the proxied web page 610, respectively. The final two web browsers 600 illustrate that the proxy frame 620 may be placed on the right (622) of the web page 610 or, alternatively, on the left (623) of the web page 610.

The location of the SP content frame (620) relative to the proxy web page 610 may be determined by factors related to one or more of (a) the characteristics (such as display requirements) of the content being presented in the web page (e.g., wide content or long content, text or graphic), (b) the characteristics (such as display requirements) of the content to be provided within the SP content frame (e.g., text or graphic, for example), and (c) the size of the PCD's display, and others.

According to one embodiment, SP content frame 620 is "persistent", in that SP content frame 620 cannot be closed, hidden, or minimized while displaying web browser 600. However, in one embodiment, the SP content within the SP content frame (620) may be changed periodically, and that change of SP content may be made independent of changes to the content of the proxied web page 610.

In another embodiment, the persistence of the SP content frame is intermittent. That is, the SP content frame may be displayed only part of the time the web page is displayed and may fade in/out at preset periods (every 30 seconds) and/or remain visible for a pre-set period (15 seconds) to allow the user of the PCD 405 to view the content. For example, the SP content frame may be displayed only during the initial display of the proxied web page and then removed after a pre-set time period (e.g., 60 seconds) has elapsed. Additionally, in another embodiment, display of the SP content frame may be tied to specific portions of the proxied web page, such that the SP content frame is displayed only when the user views that particular portions/content of the web page. When the user scrolls away from that portion of the proxied web page, the SP content frame is removed from the display.

In one implementation, the user may be permitted to change the location of the SP content frame (perhaps via a drag operation) to another visible portion of the web browser. The PWP utility 345 detects the change of location on the web browser of the SP content frame and re-orients the proxy web page relative to the new location of the SP content frame.

In yet another embodiment, PWP utility 345 may dynamically change the location of the SP content frame relative to the proxy web page based on a detected change in the proxy web page. When the proxy web page is being scrolled downwards or upwards or left or right, the PWP utility 345 detects the direction of the scroll and changes the location of the SP content frame away from the direction of the scroll. By dynamically performing this change, PWP utility 345 ensures that the SP content frame provide minimal interference with the user's experience when the user is interacting with the proxied web page.

Within the illustrative examples (FIG. 6), SP content frame 620 is smaller than the main proxied web page 610. In one embodiment, gateway 440 is configured so that, as long as the SP content frame 620 is open and is displaying advertisements or SP content, the firewall rules for accessing web pages on third party web server 455 remain applicable. Upon closing, minimizing or otherwise hiding the SP content frame 620, the gateway 440 may close the firewall, terminate the access session, and force the user to re-open the SP content frame 620 if the user wishes to continue browsing the Internet or accessing third party web pages.

Alternatively, in the embodiment in which the user has the option of paying additional fees for an direct access option, the user who initially selects the proxied access option with advertisement may later decide to select the direct access option or may attempt to close, minimize or hide the SP content frame 620. When this occurs, the PWP utility 345 generates and displays a prompt requesting the user pay an additional fee to view the third party web pages without the SP content frame 620. The user may then select whether to proceed by paying the additional fee to proceed without the SP content frame or not paying the additional fee, in which case the standard display of the proxied web page with the SP content frame continues to be presented on the web browser.

As an alternative method, the SP content frame 620 may be configured to periodically prompt the user to click on a link on the SPE content window 620 or to answer a question (e.g. which product feature the user likes better). Responses to the web links that are clicked or answers to questions may then be stored in storage 352 for later use. In one implementation, the users periodic response enables the user to continue accessing the Internet for free or for a reduced fee, and thus the user is motivated to keep the SP content frame 620 open and/or respond to periodic questions/prompts during the access session.

Turning now to FIG. 7, which illustrates a re-constituted web page in which the SP content is incorporated into the content of the re-constituted web page, according to one embodiment. With a re-constituted web page, the gateway web server 300 intercepts the third party web page and adds the SP content within the web page, rather than within a separate SP content frame (FIG. 6). As shown, web browser 700 includes a new re-constituted web page 710 in which the SP content 720 is integrated as a part of re-constituted web page 710 on web browser 700. PWP utility 345 breaks apart and "re-configures" the proxied web page to include SP content 720 and then provides the proxied web page as a re-constituted web page 710. The reconstituted web page 710 is then provided within the displayed web browser 700.

The above described embodiments of the invention may be advantageously applied to web pages retrieved from third party web sites that do not restrict either (a) the use of framed content or (b) re-displaying content (not in the original published form) without explicit permission of the site owner. However, for web sites with one or both of the above restrictions, a different embodiment of the invention is provided. FIG. 8 illustrates one method for getting around the above pair of restrictions (with respect to providing framed web page content or re-displaying web page content). The method of FIG. 8 utilizes a two-window display within the PCD display in which a first window displays the third party web page and a second, SP content window displays the SP content.

Specifically, FIG. 8 illustrates a network access system in which a third party web page 810 is presented on the display device (806) of PCD 405 (FIG. 4). The display device 806 is hereinafter referred to as PCD display 806. As shown by FIG. 8, third party web page 810 is retrieved from third party web server 455, which is accessed on the Internet 450 via network access system (400). When third party web page 810 is retrieved from third party web server 455, gateway web server 300 forwards SP content window 820 to be concurrently displayed on PCD display 806. In one embodiment, SP content window 820 is persistent, in that SP content window 620 cannot be closed, minimized, or hidden while third party web page 810 is being displayed. As shown in FIG. 8, gateway web server 300 has an associated content database/storage 352, which stores one or more SP content that is displayed within SP content window 820. Thus, when third party web page 810 is retrieved, gateway web server 300 concurrently retrieves SP content from content storage 352 and forwards the SP content to be displayed within SP content window 820 along with the third party web page 810 within PCD display 806.

In one embodiment, during the initial connection process, the user clicks a provided "web button" to open SP content window 820. The operating system of the PCD generally supports the display of windows. SP content window code is loaded on the PCD and generates the SP content window 820 during the initial connection process. The code for generating SP content window 820 contains window state-sensing code 830 that is written in client-side software, such as java, javascript, active-X, or other client-side software configured to run in the PCD's web browser. This state-sensing code 830 continually runs in the background of SP content window 820, and state sensing code 830 reports back to the web server 440 about changes to the state of the SP content window 820. For example, the state-sensing code 830 senses whether the SP content window 820 has been minimized, closed, or hidden. Additionally, state-sensing code 830 may be configured on most PCDs to always display SP content window 820 "on-top" of PCD display 806 and to prevent re-sizing, closing or minimizing of SP content window 820. In this manner, state sensing code 830 ensures that the SP content window 820 is always open and visible on the user's PCD.

As utilized herein, the term "window" (e.g., SP content window) generally refers to any structure within which the SP content may be displayed. The SP content "window", for example, may be generated by a process such as an application (code) or an operating system executing within the PCD application.

In FIG. 8, SP content window 820 is illustrated as a persistent window within the PCD's display. Accordingly, the SP content within SP content window 820 continues to be displayed throughout the session period (i.e., the entire time in which the PCD 405 is communicatively granted access to the background network/Internet via the network access system (400)), even when the PCD's web browser is closed on PCD display. In an alternate embodiment, the persistence of SP content window 820 is linked to the open status of the PCD's web browser, such that the SP content window 820 is only displayed while the PCD's web browser is open. With this alternate embodiment, the state sensing code 830 allows the SP content window 820 to be hidden while the PCD's web browser is closed.

Thus, as can be seen from the above description, the embodiment illustrated by FIG. 8 overcomes the restrictions on (a) the use of framed content and (b) re-displaying content (not in its original form) without explicit permission of the site owner. The embodiment of FIG. 8 may further be applied to third party web site that utilizes "frame-busting" technology, which would prevent the above methods of proxying and reconfiguring the third party web site from functioning properly.

Figure 9:
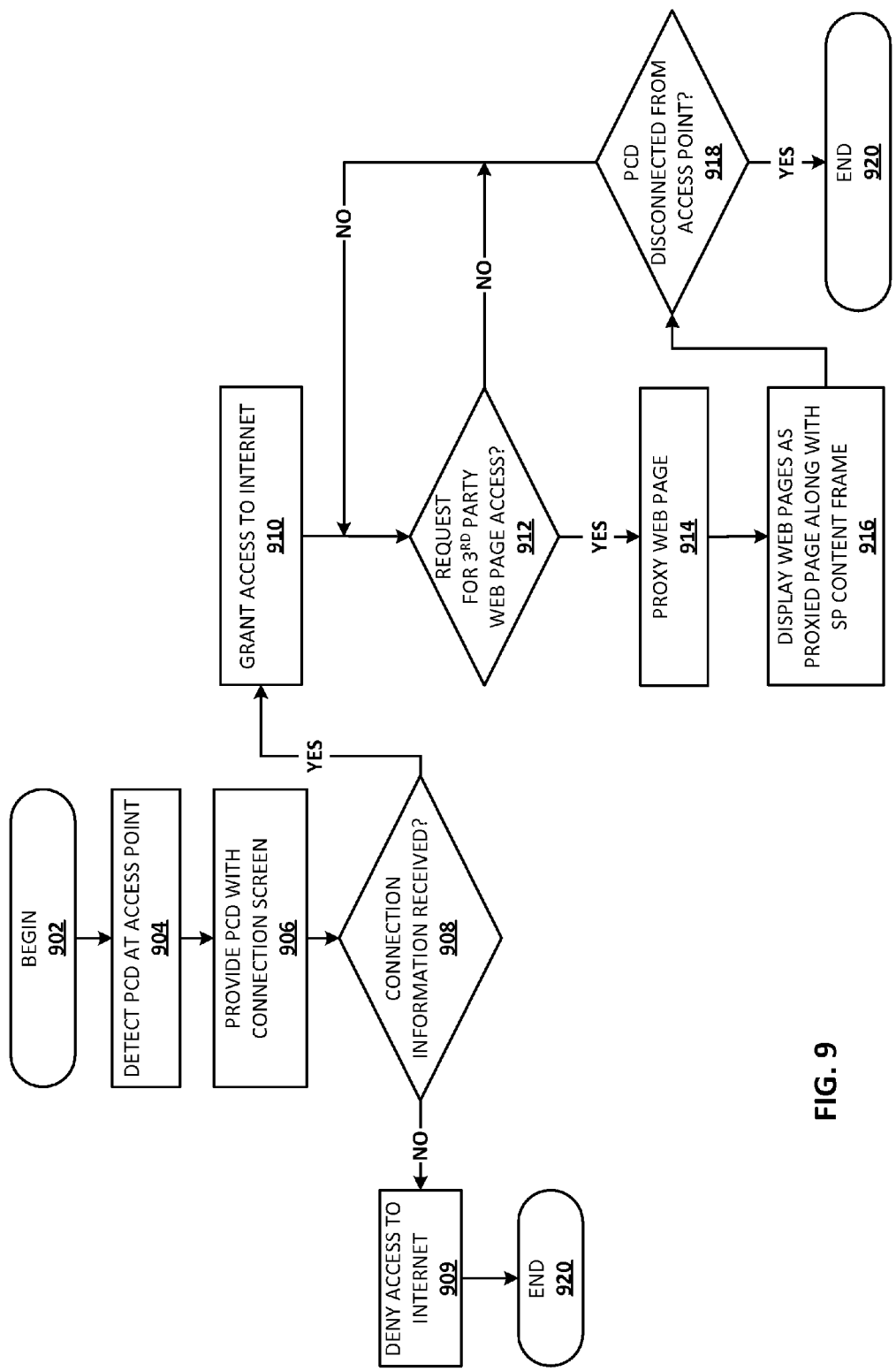
FIG. 9 is a flow chart illustrating the process of adding SP content to a third-party web page that is retrieved via the gateway access system, according to an embodiment of the invention.
Figure 10:
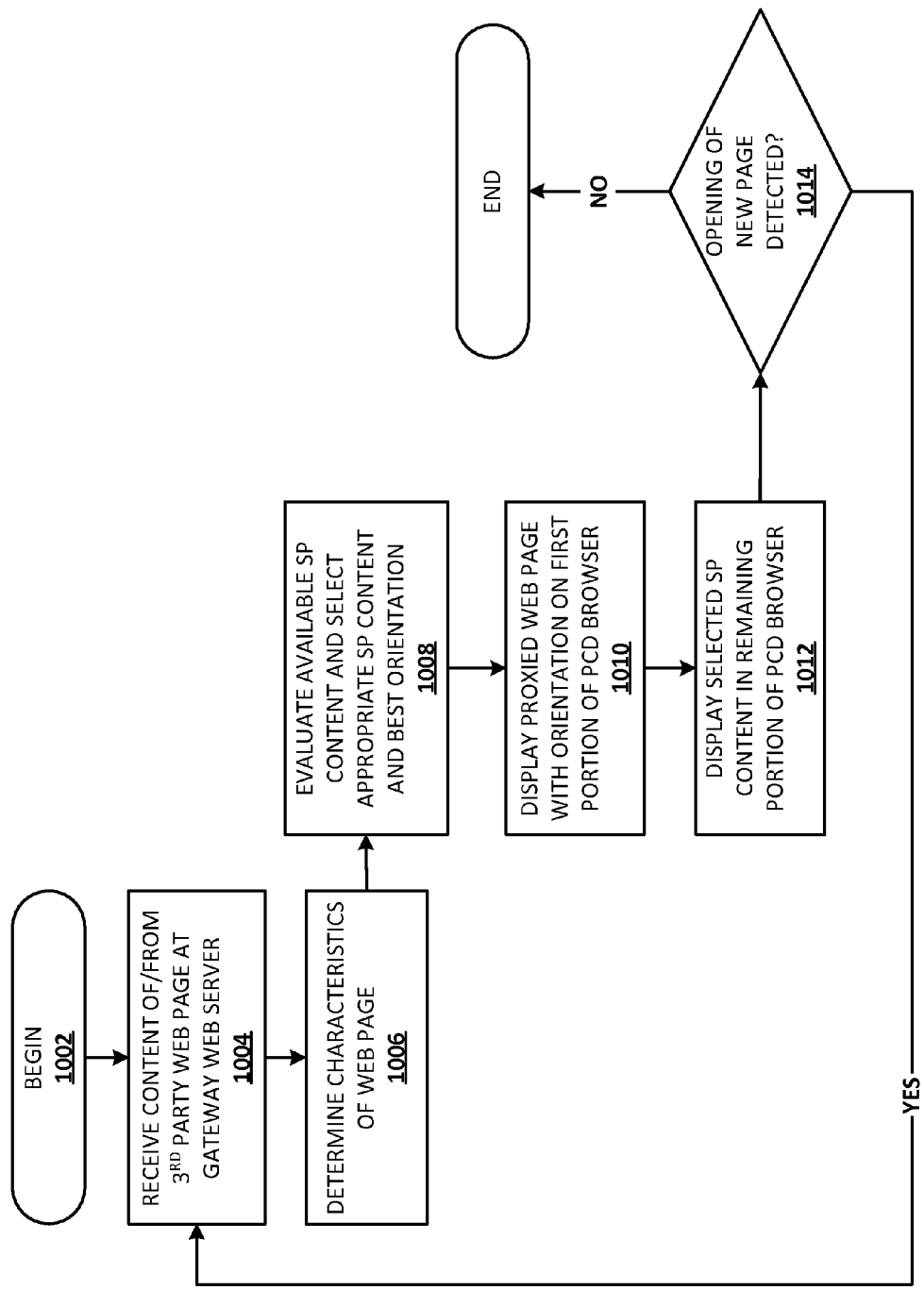
FIG. 10 is a flow chart illustrating the process of determining the orientation of the third-party web page's content relative to SP content on a proxy web page provided by the gateway web server, according to one embodiment of the invention.
Figure 11:
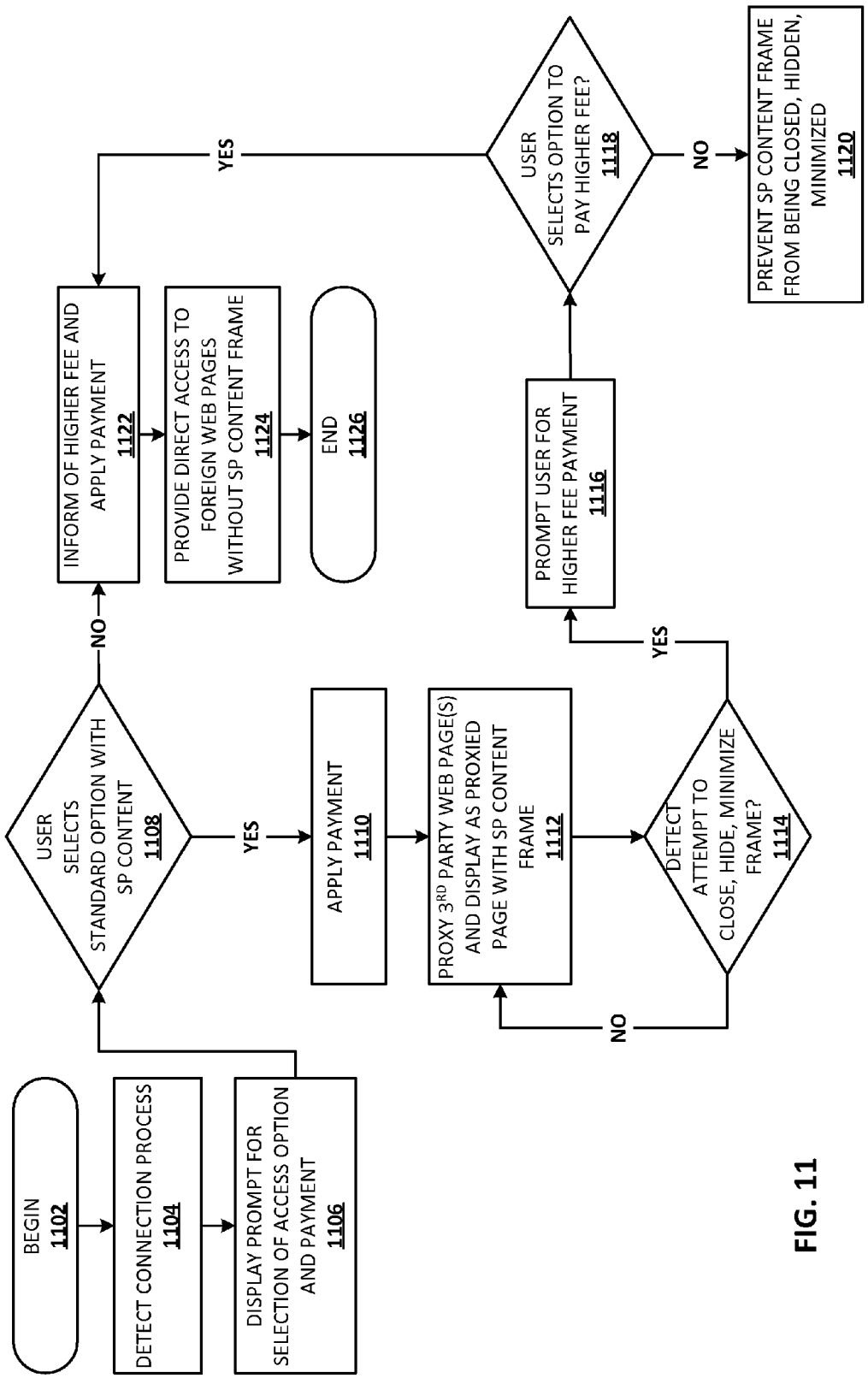
FIG. 11 is a flow chart illustrating the method of enabling user selection of a direct access or proxied web access experience when viewing a third-party web page via an ISP gateway, according to one embodiment of the invention.

FIGS. 9-11 are flow charts illustrating various methods by which the above processes of displaying an SP content frame along with a third party web page are completed, according to embodiments of the invention. Although the methods illustrated in FIGS. 9-11 may be described with reference to components shown in FIGS. 3-8, it should be understood that this is merely for convenience and alternative components and/or configurations thereof can be employed when implementing the various methods. Key portions of the methods may be completed by PWP utility 345 executing within gateway web server 300 (FIG. 3) and controlling specific operations of/on gateway web server 300, and the methods are thus described from the perspective of PWP utility 345 and gateway web server 300.

The method of FIG. 9 begins at block 902 and proceeds to block 904 with detection of a PCD at the access point. At block 906, the PCD is provided the connection screens, which include connection information and prompts for entry of user information and/or payment method (e.g., credit card number). Notably, as provided by FIG. 11, which is described below, the connections pages may also prompt the user to elect to opt out of the proxied access option, which includes a persistent display of the SP content frame. A determination is made at block 908 whether the required information and other inputs have been received to enable access beyond the firewall to the Internet. If the information is not received, access to the Internet is denied, as provided at block 909.

Assuming the required information is received, access to the Internet is granted to the PCD, as shown at block 910. When the user enters a request for a third party web page (e.g., the user browses to or clicks on a link for third party web site), as determined at decision block 912, the gateway web server intervenes in the web page download and proxies the web page, as shown at block 914. The gateway web server then concurrently displays the proxied web page on the PCDs browser along with SP content in a persistent SP content frame, at shown at block 916. The gateway web server continues to display all subsequent third party web pages as proxied web pages. The gateway web server also continues to display the SP content frame along with the proxied web pages, until the PCD is disconnected from the access point, as determined at block 918. The process then ends at block 920.

FIG. 10 is an operational flow diagram generally illustrating the method for selecting the SP content to be displayed within the SP content frame (e.g., window 620 of FIG. 6) on the PCDs browser. The method begins at block 1002 and proceeds to block 1004 at which the content of the third party web page is received at the gateway web server. At block 1006, PWP utility evaluates the content of the web page to determine the characteristics (dimension, text versus graphics, size and location of text/graphics, etc.) of the received third party web page. PWP utility then evaluates, at block 1008, the most effective SP content (e.g., advertisements) to utilized from the collection of SP contents available (from within the storage). In one embodiment, this evaluation may involve first identifying key words within content of the third party web page and then linking those key words to specific SP content (advertisement), which may also be of interest to the user of the PCD. Additionally, in one embodiment, the SP content may be further filtered down based information about the user of the PCD or the type or the location of the PCD. For example, if the PCD is a smart phone with a small display screen, the type of SP content and placement of SP content frame may be different than when the proxied web page is displayed on a standard sized laptop display.

PWP utility divides up the available display area, with a first portion of the space allocated to display the proxied web page and the remaining portion assigned to the SP content frame. The SP content frame is then oriented to fill up the remaining portion of the display. As provided at block 1010, PWP utility displays the proxy web page in an orientation relative to the display screen best suited to display the content of the proxied web page. Contemporaneously with displaying the proxied web page, the selected SP content is provided for display within the SP content frame, as shown at block 1012. As described above, the SP content frame is persistent, while the SP content may change periodically. When a request for a new third party web page is detected, as determined at block 1014, the method repeats the above steps (1004-1012), which determine a best orientation of the proxied web page and selects the SP content to display with the proxied web page.

FIG. 11 is an operational flow diagram generally illustrating the method for enabling user selection of whether the SP content frame remains a part of the user's "access experience". The method begins at block 1102 and proceeds to block 1104 at which the PWP utility detects the connection process. The PWP utility generates and displays the Welcome and Selections page 500 (FIG. 5) at block 1106. The Welcome and Selections page 500 provides options for the user to select a direct access experience (505, FIG. 5) or a proxied access experience (515, FIG. 5), which includes a persistent display of the SP content frame. The user is prompted to select one of the two (or more) options.

At block 1108, PWP utility determines whether the user selects the proxied access option 515. When PWP utility detects that the user does not select the proxied access option 515 (i.e., the user selects the direct access option 505), the PWP utility relinquishes control of the PCD's Internet access (browsing) experience. PWP utility informs the user of the higher fee being charged and applies the fee to the payment method at block 1122. The user's PCD is provided direct access to the Internet and to the third party web sites, without the SP content frame being displayed, as provided at block 1124. The process then terminates at block 1126.

At block 1108, however, when the user has selected the proxied access option 515, the PWP utility applies the appropriate payment (for proxied access) to the user's payment method (e.g., credit card) at block 1110. Then, the PWP utility triggers the gateway web server to proxy all third party web pages requested by the user and to provide a display of both the proxied web page and the SP content frame, as shown at block 1112.

If during the subsequent user experience, PWP utility detects an attempt by the user to close, hide, or minimize the SP content frame, as determined at block 1114, PWP utility prompts the user to pay the higher access fee for the direct access experience, as shown at block 1116. If the user does not select that option (perhaps within a preset time after the prompt is generated) at block 1118, PWP utility prevents the SP content frame from being closed, hidden or minimized, as shown at block 1120. However, if PWP utility detects a response indicating the user agrees to pay the higher fee for an ad-less experience, PWP utility informs the user of the higher fee being charged and applies the fee to the payment method at block 1122. Then, PWP utility removes the SP content frame from being displayed in the PCD's browser and forwards the PCD directly to the third party web page, as shown at block 1124. The process then ends at block 1126.

In one embodiment, information received about the PCD's location is utilized to determine what SP content to provide along with the requested third party web pages. Internet service providers or gateway service providers that provide access in public locations such as hotels, restaurants, airports, or in distributed areas around a city, may additionally provide other services to the customers based on their known geographic location or other known information about the customer. While described as SP content, it is understood that these services typically take the form of advertisements that are offered to the customer in the specific location. With the methods described herein, these advertising services may now be offered within the SP content frame, throughout the entire period in which the PCD is connected (i.e., during the entire access session), rather than in a few gateway web pages during the short period required to complete the initial connection process.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   enabling a connection between a personal computing device (PCD) and a gateway access system, wherein the gateway access system provides access to a network;
   facilitating retrieval of a first content from the network to the PCD, wherein said first content is content that is to be displayed within a first window on the PCD;
   providing program code to the PCD that when executed enables persistent display of a second window on the PCD, wherein the first window does not overlap the second window;
   transmitting an advertisement for output within the second window on the PCD, wherein the advertisement is transmitted for persistent, concurrent display along with the display of the first content on the PCD;
   during an initial connection process between the PCD and the gateway access system, prompting a user of the PCD for selection of an access option from among: (a) a first option to enable access to and output of requested first content without the advertisement; and (b) at least one second option, which enables access to and output of the first content along with the advertisement;
   wherein selection of the first option includes an associated first fee to access the gateway access system and selection of the second option includes a second fee to access the gateway access system, and wherein said prompting for selection further comprises:
      enabling selection of one or more intermediate options having associated intermediate fees between the first fee and the second fee, wherein the intermediate options provide a display of a corresponding, pre-set amount of advertisements on the PCD along with the first content depending on an amount of an associated intermediate fee paid during the initial connection process; and
      applying one of the first fee, the second fee or the intermediate fee to a payment method provided during the initial connection process based on which option among the first option, the second option, or the one or more intermediate option is selected;
      when the first option is selected, enabling retrieval and output of the requested first content without concurrent display of the second window and the advertisement at the PCD; and
   pre-determining a specific orientation for displaying the second window relative to the first window on the PCD;
   wherein said code that enables persistent display of the second window comprises code for:
      detecting a scrolling of the first content in a direction within the first window at which the second window is located; and
      dynamically re-positioning the orientation of the second window away from the direction of the scrolling of the first content to minimize interference in viewing a section of the first content being scrolled to.

2. The method of claim 1, wherein said program code that enables persistent display of the second window is provided via a download to the PCD during an initial connection process.

3. The method of claim 1, further comprising:
   providing program code that when executed links a state sensor with the second window, wherein the state sensor detects pre-defined operations including an attempt to close the second window at the PCD, wherein the state sensor responds to a detection of one of the pre-defined operations by alerting the gateway access system when the pre-defined operations is detected on the persistent window, while preventing the operation from completing.

4. The method of claim 1, further comprising:
   providing program code that when executed links a state sensor with the second window, wherein the state sensor detects pre-defined operations including an attempt to minimize the second window at the PCD, wherein the state sensor responds to a detection of one of the pre-defined operations by alerting the gateway access system when the pre-defined operation is detected on the persistent window, while preventing the operation from completing.

5. The method of claim 1, further comprising:
providing program code that when executed links a state sensor with the second window, wherein the state sensor detects pre-defined operations including an attempt to hide the second window at the PCD, wherein the state sensor responds to a detection one of the pre-defined operations by alerting the gateway access system when the pre-defined operations is detected on the persistent window, while preventing the operation from completing.

6. The method of claim 1, further comprising:
following an initial connection process, providing access to the network, wherein subsequently requested first content may be retrieved directly from the network by the PCD;
detecting a request from the PCD for retrieval of the first content from the network; and
transmitting the advertisement for inclusion in the second window, wherein the advertisement may be provided to the PCD for concurrent output on the PCD.

7. The method of claim 1, wherein when the second option is selected, said method further comprises:
initiating transmission of the program code to the PCD that enables persistent display of the second window;
triggering a monitoring for attempts at the PCD to minimize, hide, or close a frame containing the advertisement in the PCD display;
when an attempt is detected:
prompting for selection of the first option to enable outputting the first content without the advertisement; and
when the first option is selected:
if a change to the first option requires payment of a fee, processing the fee; and
removing the advertisement from the display, wherein the first content and subsequently requested first content are provided without inclusion of the advertisement within the display, wherein said removing includes triggering an expansion of the first window to fill an entire display area of the PCD, wherein the second window is no longer provided on the PCD and the advertisement is no longer viewable on the PCD.

8. The method of claim 1, wherein said program code for enabling display of the second window includes code for enabling intermittent persistence of the second window, wherein the second window is displayed at the PCD for one or more pre-set periods during the display of the first content and is hidden for remaining periods during the display of the first content, wherein the one or more pre-set periods may include an initial pre-set amount of time during which the first content is first returned for outputting at the PCD.

9. The method of claim 1, wherein:
the gateway access system comprises a wireless access point, wherein the PCD connects to the gateway access system by wireless communication with the wireless access point;
the gateway access system comprises a gateway server;
the network is separate from the gateway access system and comprises (a) the Internet, to which the gateway server is connected and (b) one or more third party content providers accessible via the Internet and which provide one or more first contents;
the output is a viewable output provided on a display device of the PCD; and
the first content is a web page and a third party content provider is a web server accessible via the Internet.

10. The method of claim 1, wherein the advertisement is an advertisement provided by one of (a) a service provider and (b) a business customer of the service provider, said method further comprising:
tracking and recording an amount of display time allotted to the advertisement during accesses by PCDs to the gateway access system; and
automatically determining a fee to be charged for the display based on a calculation that factors in the amount of display time allotted to the advertisement.

11. A system comprising:
means for enabling a connection between a personal computing device (PCD) and a gateway access system, wherein the gateway access system provides access to a network;
means for facilitating retrieval of a first content from the network to the PCD, wherein said first content is content that is to be displayed within a first window on the PCD;
means for providing program code to the PCD that when executed enables persistent display of a second window on the PCD, wherein the first window does not overlap the second window; and
means for transmitting the advertisement for output within the second window on the PCD, wherein an advertisement is transmitted for persistent, concurrent display along with the display of the first content on the PCD;
during an initial connection process between the PCD and the gateway access system, means for prompting a user of the PCD for selection of an access option from among: (a) a first option to enable access to and output of requested first content without the advertisement; and (b) at least one second option, which enables access to and output of the first content along with the advertisement;
wherein selection of the first option includes an associated first fee to access the gateway access system and selection of the second option includes a second fee to access the gateway access system, and wherein said means for prompting for selection further comprises:
means for enabling selection of one or more intermediate options having associated intermediate fees between the first fee and the second fee, wherein the intermediate options provide a display of a corresponding, pre-set amount of advertisements on the PCD along with the first content depending on an amount of an associated intermediate fee paid during the initial connection process; and
means for applying one of the first fee, the second fee or the intermediate fee to a payment method provided during the initial connection process based on which option among the first option, the second option, or the one or more intermediate option is selected; and
means for enabling retrieval and output of the requested first content without concurrent display of the second window and the advertisement at the PCD, when the first option is selected; and
means for pre-determining a specific orientation for displaying the second window relative to the first window on the PCD;
wherein said code that enables persistent display of the second window comprises code for:

detecting a scrolling of the first content in a direction within the first window at which the second window is located; and dynamically re-positioning the orientation of the second window away from the direction of the scrolling of the first content to minimize interference in viewing a section of the first content being scrolled to.

12. The system of claim 11, wherein said means for providing program code that enables persistent display of the second window comprise means for providing the program code via a download to the PCD during an initial connection process.

13. The system of claim 11, further comprising:
means for providing program code that when executed links a state sensor with the second window, wherein the state sensor detects pre-defined operations including an attempt to close the second window at the PCD, wherein the state sensor responds to a detection of one of the pre-defined operations by alerting the gateway access system when the pre-defined operations is detected on the persistent window.

14. The system of claim 11, further comprising:
means for providing program code that when executed links a state sensor with the second window, wherein the state sensor detects pre-defined operations including an attempt to minimize the second window at the PCD, wherein the state sensor responds to a detection of one of the pre-defined operations by alerting the gateway access system when the pre-defined operation is detected on the persistent window.

15. The system of claim 11, further comprising:
means for providing program code that when executed links a state sensor with the second window, wherein the state sensor detects pre-defined operations including an attempt to hide the second window at the PCD, wherein the state sensor responds to a detection one of the pre-defined operations by alerting the gateway access system when the pre-defined operations is detected on the persistent window.

16. The system of claim 11, further comprising:
following an initial connection process, means for providing access to the network, wherein subsequently requested first content may be retrieved directly from the network by the PCD;
means for detecting a request from the PCD for retrieval of the first content from the network; and
means for transmitting the advertisement for inclusion in the second window, wherein the advertisement may be provided to the PCD for concurrent output on the PCD.

17. The system of claim 11, wherein when the second option is selected, said system further comprises:
means for initiating transmission of the program code to the PCD that enables persistent display of the second window;
means for triggering a monitoring for attempts at the PCD to minimize, hide, or close a frame containing the advertisement in the PCD display;
when an attempt is detected:
means for prompting for selection of the first option to enable outputting the first content without the advertisement; and
when the first option is selected:
if a change to the first option requires payment of a fee, means for processing the fee; and
means for removing the advertisement from the display, wherein the first content and subsequently requested first content are provided without inclusion of the advertisement within the display, wherein said removing includes triggering an expansion of the first window to fill an entire display area of the PCD, wherein the second window is no longer provided on the PCD and the advertisement is no longer viewable on the PCD.

18. The system of claim 11, wherein said program code for enabling display of the second window includes code for enabling intermittent persistence of the second window, wherein the second window is displayed at the PCD for one or more pre-set periods during the display of the first content and is hidden for remaining periods during the display of the first content, wherein the one or more pre-set periods may include an initial pre-set amount of time during which the first content is first returned for outputting at the PCD.

19. The system of claim 11, wherein:
the gateway access system comprises a gateway server;
the network is separate from the gateway access system and comprises (a) the Internet, to which the gateway server is connected and (b) one or more third party content providers accessible via the Internet and which provide one or more first contents;
the output is a viewable output provided on a display device of the PCD; and
the first content is a web page and a third party content provider is a web server accessible via the Internet.

20. The system of claim 11, wherein the gateway access system comprises a wireless access point, wherein the PCD connects to the gateway access system by wireless communication with the wireless access point.

21. The system of claim 11, wherein the advertisement is an advertisement provided by one of (a) a service provider and (b) a business customer of the service provider, said method further comprising:
means for tracking and recording an amount of display time allotted to the advertisement during accesses by PCDs to the gateway access system; and
means for automatically determining a fee to be charged for the display based on a calculation that factors in the amount of display time allotted to the advertisement.

22. A computer program product comprising:
a computer readable medium; and
program instructions on the computer readable medium that when executed provides the functions of:
enabling a connection between a personal computing device (PCD) and a gateway access system, wherein the gateway access system provides access to a network;
facilitating retrieval of a first content from the network to the PCD, wherein said first content is content that is to be displayed within a first window on the PCD;
providing program code to the PCD that when executed enables persistent display of a second window on the PCD, wherein the first window does not overlap the second window;
transmitting an advertisement for output within the second window on the PCD, wherein the advertisement is transmitted for persistent, concurrent display along with the display of the first content on the PCD;
during an initial connection process between the PCD and the gateway access system, prompting a user of the PCD for selection of an access option from among: (a) a first option to enable access to and output of requested first content without the advertisement; and (b) at least one second option, which enables access to and output of the first content along with the advertisement;
wherein selection of the first option includes an associated first fee to access the gateway access system and selection of the second option includes a second fee to access the gateway access system, and wherein said instructions for prompting for selection further comprises instructions for:
- enabling selection of one or more intermediate options having associated intermediate fees between the first fee and the second fee, wherein the intermediate options provide a display of a corresponding, pre-set amount of advertisements on the PCD along with the first content depending on an amount of an associated intermediate fee paid during the initial connection process; and
- applying one of the first fee, the second fee or the intermediate fee to a payment method provided during the initial connection process based on which option among the first option, the second option, or the one or more intermediate option is selected; and
- when the first option is selected, enabling retrieval and output of the requested first content without concurrent display of the second window and advertisement at the PCD; and
- pre-determining a specific orientation for displaying the second window relative to the first window on the PCD;

wherein said code that enables persistent display of the second window comprises code for:
- detecting a scrolling of the first content in a direction within the first window at which the second window is located; and
- dynamically re-positioning the orientation of the second window away from the direction of the scrolling of the first content to minimize interference in viewing a section of the first content being scrolled to.

23. The computer program product of claim 22, wherein said instructions for providing program code that enables persistent display of the second window includes instructions for providing the program code via a download to the PCD during an initial connection process.

24. The computer program product of claim 22, further comprising instructions for:
providing program code that when executed links a state sensor with the second window, wherein the state sensor detects pre-defined operations including an attempt to close the second window at the PCD, wherein the state sensor responds to a detection of one of the pre-defined operations by alerting the gateway access system when the pre-defined operations is detected on the persistent window.

25. The computer program product of claim 22, further comprising instructions for:
providing program code that when executed links a state sensor with the second window, wherein the state sensor detects pre-defined operations including an attempt to minimize the second window at the PCD, wherein the state sensor responds to a detection of one of the pre-defined operations by alerting the gateway access system when the pre-defined operation is detected on the persistent window.

26. The computer program product of claim 22, further comprising instructions for:
providing program code that when executed links a state sensor with the second window, wherein the state sensor detects pre-defined operations including an attempt to hide the second window at the PCD, wherein the state sensor responds to a detection one of the pre-defined operations by alerting the gateway access system when the pre-defined operations is detected on the persistent window.

27. The computer program product of claim 22, further comprising instructions for:
- following an initial connection process, providing access to the network, wherein subsequently requested first content may be retrieved directly from the network by the PCD;
- detecting a request from the PCD for retrieval of the first content from the network; and
- transmitting the advertisement for inclusion in the second window, wherein the advertisement may be provided to the PCD for concurrent output on the PCD.

28. The computer program product of claim 22, wherein when the second option is selected, said instructions further comprises instructions for:
- initiating transmission of the program code to the PCD that enables persistent display of the second window;
- triggering a monitoring for attempts at the PCD to minimize, hide, or close a frame containing the advertisement in the PCD display;
- when an attempt is detected:
  - prompting for selection of the first option to enable outputting the first content without the advertisement; and
  - when the first option is selected:
    - if a change to the first option requires payment of a fee, processing the fee; and
    - removing the advertisement from the display, wherein the first content and subsequently requested first content are provided without inclusion of the advertisement within the display, wherein said removing includes triggering an expansion of the first window to fill an entire display area of the PCD, wherein the second window is no longer provided on the PCD and the advertisement is no longer viewable on the PCD.

29. The computer program product of claim 22, wherein said program code for enabling display of the second window includes code for enabling intermittent persistence of the second window, wherein the second window is displayed at the PCD for one or more pre-set periods during the display of the first content and is hidden for remaining periods during the display of the first content, wherein the one or more pre-set periods may include an initial pre-set amount of time during which the first content is first returned for outputting at the PCD.

30. The computer program product of claim 22, wherein:
- the gateway access system comprises a wireless access point, wherein the PCD connects to the gateway access system by wireless communication with the wireless access point;
- the gateway access system comprises a gateway server;
- the network is separate from the gateway access system and comprises (a) the Internet, to which the gateway server is connected and (b) one or more third party content providers accessible via the Internet and which provide one or more first contents;
- the output is a viewable output provided on a display device of the PCD; and
- the first content is a web page and a third party content provider is a web server accessible via the Internet.

31. The computer program product of claim 22, wherein the advertisement is an advertisement provided by one of (a)

a service provider and (b) a business customer of the service provider, said instructions further comprising instructions for:

tracking and recording an amount of display time allotted to the advertisement during accesses by PCDs to the gateway access system; and automatically determining a fee to be charged for the display based on a calculation that factors in the amount of display time allotted to the advertisement.

* * * * *